United States Patent
Mochizuki et al.

(10) Patent No.: US 10,227,486 B2
(45) Date of Patent: *Mar. 12, 2019

(54) CONTACTING PART MADE OF THERMOPLASTIC RESIN COMPOSITION WITH REDUCED SQUEAKING NOISES

(71) Applicant: Techno Polymer Co., Ltd., Tokyo (JP)

(72) Inventors: Isamu Mochizuki, Tokyo (JP); Kazuya Egawa, Tokyo (JP)

(73) Assignee: TECHNO POLYMER CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/062,446

(22) Filed: Mar. 7, 2016

(65) Prior Publication Data

US 2016/0185949 A1    Jun. 30, 2016

Related U.S. Application Data

(62) Division of application No. 13/818,434, filed as application No. PCT/JP2011/068846 on Aug. 22, 2011, now Pat. No. 9,309,390.

(30) Foreign Application Priority Data

Aug. 27, 2010   (JP) .................................. 2010-191094

(51) Int. Cl.
|  |  |
|---|---|
| *C08L 69/00* | (2006.01) |
| *C08L 51/04* | (2006.01) |
| *C08L 51/06* | (2006.01) |
| *C08L 15/00* | (2006.01) |
| C08L 23/06 | (2006.01) |
| C08L 23/16 | (2006.01) |
| C08L 83/04 | (2006.01) |
| C08L 55/02 | (2006.01) |

(52) U.S. Cl.
CPC ............... *C08L 51/04* (2013.01); *C08L 15/00* (2013.01); *C08L 51/06* (2013.01); *C08L 69/00* (2013.01); C08L 23/06 (2013.01); C08L 23/16 (2013.01); C08L 55/02 (2013.01); C08L 83/04 (2013.01); C08L 2205/03 (2013.01); C08L 2205/035 (2013.01); C08L 2205/06 (2013.01)

(58) Field of Classification Search
None
See application file for complete search history.

(56) References Cited

U.S. PATENT DOCUMENTS

| 4,390,651 A | 6/1983 | Brown, Jr. |
|---|---|---|
| 4,596,416 A * | 6/1986 | Muller ...................... B60R 7/06 224/282 |
| 6,197,857 B1 | 3/2001 | Nodera et al. |
| 9,309,390 B2 * | 4/2016 | Mochizuki .............. C08L 51/04 |
| 2004/0127642 A1 | 7/2004 | Michels et al. |
| 2011/0011116 A1 | 1/2011 | Kim et al. |

FOREIGN PATENT DOCUMENTS

| JP | 56-014549 | 2/1981 |
|---|---|---|
| JP | 02-084457 | 3/1990 |
| JP | 02-272051 | 11/1990 |
| JP | 04-293934 | 10/1992 |
| JP | 10-316833 | 12/1998 |
| JP | 2000-119477 | 4/2000 |
| JP | 2006-328134 | 12/2006 |
| JP | 2008-239666 | 10/2008 |
| JP | 2008-239667 | 10/2008 |
| JP | 2008239666 | * 10/2008 |

OTHER PUBLICATIONS

DOW Technical Information sheet for ENGAGE8842 (2011). (Year: 2011).*

Hiroshi Matsukawa: "Physics of Friction", vol. 24, No. 6, pp. 328-333, Apr. 15, 2003.

* cited by examiner

*Primary Examiner* — David J Buttner
(74) *Attorney, Agent, or Firm* — Kratz, Quintos & Hanson, LLP (57) ABSTRACT

A contacting part made of a thermoplastic resin composition is provided, which is characterized in that generation of squeaking noises that are generated when members rub against each other is remarkably reduced, that an effect of reducing squeaking noises is maintained without deterioration even when being placed under high temperatures for a long time, and further that not only heat resistance, impact resistance, and moldability are superior, but also safety at the time of collision is superior because of ductile fracture.

The contacting part made of a thermoplastic resin composition [X] is composed of 20 to 65 parts by mass of a rubber-reinforced vinyl resin [A]; and 35 to 80 parts by mass of a polycarbonate resin (provided that the total amount of [A] and [B] is 100 parts by mass);

wherein:

the rubber-reinforced vinyl resin [A] comprises a rubber-reinforced vinyl resin [A1] obtained by polymerizing a vinyl monomer [c1] in the presence of an ethylene-α-olefin rubber polymer [a1] all having Tm (melting point) of 0° C. or higher; and the amount of the ethylene-α-olefin rubber polymer [a1] is 5 to 30% by mass based on 100% by mass of the thermoplastic resin composition [X].

5 Claims, 2 Drawing Sheets

CONTACTING PART MADE OF THERMOPLASTIC RESIN COMPOSITION WITH REDUCED SQUEAKING NOISES

This application is a divisional application of U.S. application Ser. No. 13/818,434, filed Apr. 18, 2013, which issued as U.S. Pat. No. 9,309,390 on Apr. 12, 2016, which is a § 371 application of International Application PCT/JP2011/068846, filed on Aug. 22, 2011, which claims benefit to Japanese Application 2010-191094, filed Aug. 27, 2010, the entire contents of which are incorporated herein by reference in their entireties.

TECHNICAL FIELD

The present invention relates to a contacting part made of a thermoplastic resin composition with reduced squeaking noises, and more particularly, to a contacting part made of a thermoplastic resin composition, which have been remarkably reduced in squeaking noises caused by coming into contact with and rubbing against other members.

BACKGROUND ART

ABS resin is widely used in the fields of automobiles, household electric appliances, OA appliances, etc., due to its superior mechanical properties and moldability, but its usages are limited because of insufficient heat resistance and impact strength. On the other hand, polycarbonate (PC) resin is widely used in the fields of automobiles, household electric appliances, precision instruments, etc., due to its superior heat resistance and impact strength, but its usages are limited because of insufficient moldability and impact strength at low temperatures.

As a method for supplementing these drawbacks, it is known to blend an ABS resin and a polycarbonate resin. According to this method, heat resistance and impact strength of an ABS resin are not only improved, but also moldability and impact strength at low temperatures of a polycarbonate resin are improved, and as a result, a blended resin superior in moldability, impact strength, mechanical strength and heat resistance can be obtained. This blended resin made it possible to use in a wide variety of fields such as automobile interior parts, etc., requiring safety of crew members at the time of collision.

However, when the molded articles made of a PC/ABS resin obtained by blending an ABS resin and a polycarbonate resin are used as automobile interior parts, with vibration during car driving, the PC/ABS automobile interior parts come into contact with and rub against each other or other members such as a living sheet or a foam made of ABS resin, acrylic resin, polyvinyl chloride, chloroprene resin, polyurethane, natural rubber, polyester or polyethylene, and squeaking noises (rubbing noises) may be generated. Moreover, when it is used as parts such as a drawer of desks and doors, the PC/ABS parts come into contact with the other members of metallic materials such as SUS, aluminum and brass parts, and ABS resin, squeaking noises (rubbing noises) may be generated. These squeaking noises are a major cause to spoil comfortableness and silence inside cars, offices and houses, and therefore, reduction in squeaking noises is strongly demanded.

Figure 1:
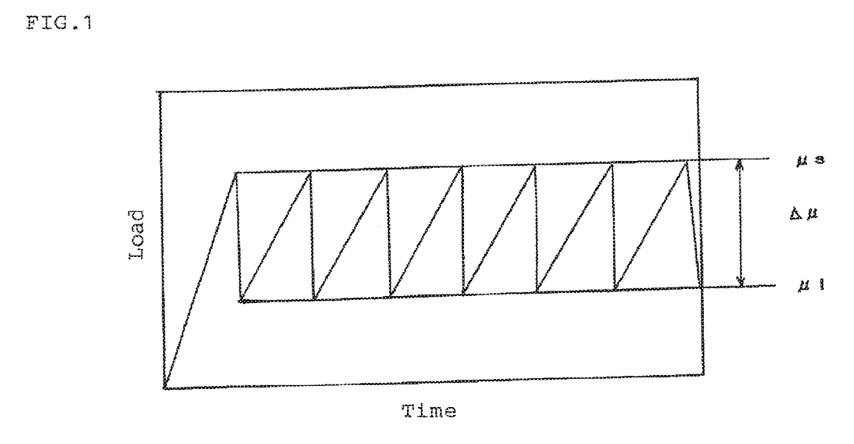
FIG. 1 is an explanatory diagram of a stick slip phenomenon.
Figure 2:
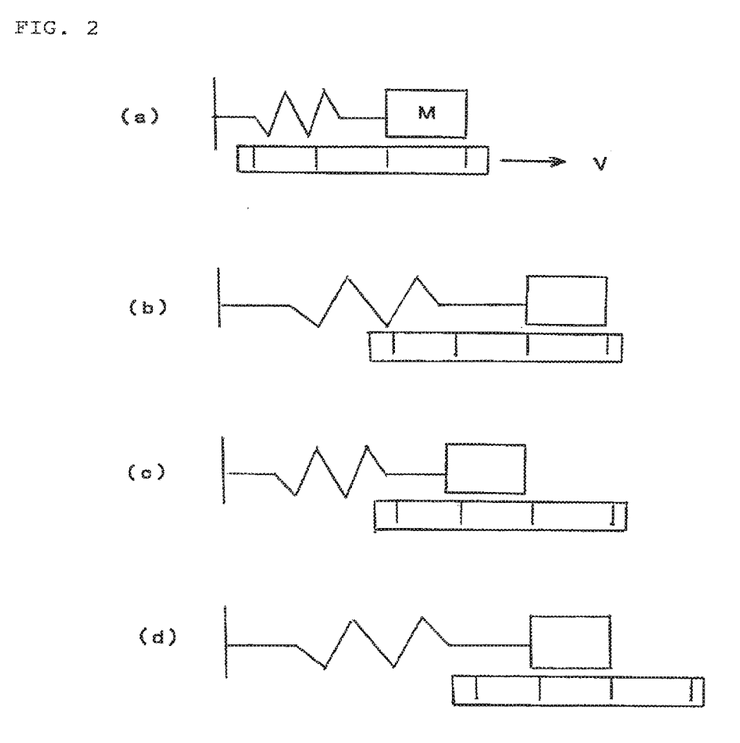

Since the above-mentioned PC/ABS resin and polycarbonate resin are amorphous resins, they are higher in coefficient of friction as compared with crystalline resins such as polyethylene, polypropylene, polyacetal and the like. Accordingly, when they are used for a switch part of an instrument panel in an automobile or a slide part of a business desk, etc., fitting with other members, a stick slip phenomenon as illustrated in FIG. 1 occurs to generate unpleasant noises (squeaking noises) because of a large coefficient of friction. The stick slip phenomenon is a phenomenon that is generated when two objects rub against each other. When an object M connected with a spring is placed on a driving table that moves at a driving speed V, as illustrated by a model of FIG. 2($a$), the object M moves toward the right direction first as illustrated in FIG. 2($b$) together with the table moving at the driving speed V by the action of a static frictional force. When the force by which the object M is to be restored to its original position becomes equal to the static frictional force, the object M starts to slip in the opposite direction to the driving speed V. At this time, the object M comes to receive a kinematic frictional force, and the slip is stopped when the force of the spring becomes equal to the kinematic frictional force as illustrated in FIG. 2($c$), so that the object M comes again into a state where it attaches on the driving table and it moves again in the same direction as the driving speed V (FIG. 2($d$)). This is called a stick slip phenomenon, and it has been argued that, as illustrated in FIG. 1, if the difference $\Delta\mu$ between the coefficient of static friction $\mu s$ and the lower end of a saw wavy form $\mu l$ is large, squeaking noises tend to be generated easily. Meanwhile, a dynamic friction coefficient is a middle value between $\mu s$ and $\mu l$.

Such a squeaking noise is a major cause that spoils comfortableness and silence in cars, offices and houses, and therefore reduction of squeaking noise is demanded strongly.

On the other hand, it is known that the stick slip phenomenon occurs remarkably when the friction velocity dependency of a coefficient of friction determined on the basis of the Amonton-Coulomb's law takes a negative value (see non-patent document 1). Accordingly, it is possible to inhibit the occurrence of the stick slip phenomenon and reduce the generation of squeaking noises by bringing the friction velocity dependency of the coefficient of friction close to zero or by adjusting it to a positive value greater than zero.

Then, in order to prevent such squeaking noises, a method of applying Teflon (registered trademark) coating to the surface of a member, a method of mounting a Teflon (registered trademark) tape, a method of mounting a non-woven fabric cloth, a method of applying a silicone oil, etc. have been performed. However, the step of mounting or applying is very complicated and requires time and effort, and there is a problem that the effect does not continue when being placed under high temperatures for a long time.

As a method for changing the properties of the material contacting parts to be used for an automobile interior part and an indoor mechanism part, a method for incorporating a silicone oil into an ABS resin and a method for incorporating an epoxy-containing olefin copolymer into an ABS resin, etc., have been proposed. For example, there have been disclosed a technology of incorporating an organosilicon compound into a PC/ABS resin (see patent document 1), a technology of incorporating a flame retardant, a flame retarding aid and a silicone oil into an ABS resin (see patent document 2), a technology of incorporating a silicone oil into a rubber reinforced polystyrene resin (see patent document 3), a technology of incorporating an alkali(earth) metal salt of an alkane sulfonate into an ABS resin (see patent document 4), and further, a technology of incorporating a modified polyorganosiloxane having at least one reactive group selected from among an epoxy group, a carboxyl group and an acid anhydride group into an ABS resin (see patent document 5).

However, an effect of reducing squeaking noises obtained by these methods is not said to be sufficient. Even if the effect of preventing squeaking noises is considerably exhibited immediately after molding, the durability of the effect is poor, and in particular, there is a problem that the effect deteriorates remarkably when being placed under high temperatures for a long time. Moreover, in recent years, there has been demanded, besides impact strength, ductile fracture, not brittle fracture having a fear of scattering splinters of a broken molded article in order to secure safety of crew members at the time of collision in usages of vehicle interior parts.

PRIOR ART DOCUMENTS

Patent Documents

Patent document 1: Japanese Examined Publication 63(1988)-56267
Patent document 2: Japanese Patent No. 2798396
Patent document 3: Japanese Patent No. 2688619
Patent document 4: Japanese Patent. No. 2659467
Patent document 5: Japanese Laid-open Publication 10(1998)-316833

Non-Patent Documents

Non-patent document 1: Journal of The Surface Science of Japan, Vol. 24, No. 6, PP. 328-333, 2003

DISCLOSURE OF THE INVENTION

Problem to be Solved by the Invention

In view of such situations, an object of the present invention is to provide a contacting part made of a thermoplastic resin composition, superior in moldability, impact strength, mechanical strength and heat resistance, which is characterized in that generation of squeaking noises that are generated when members rub against each other is remarkably reduced, that an effect of reducing squeaking noises is maintained without deterioration even when being placed under high temperatures for a long time, and further that it can be used in a wide variety of fields such as automobile interior parts requiring safety of crew members at the time of collision, and the like.

Solutions to the Problems

The present inventors have made an extensive series of studies in order to solve the above-described problems and, as a result, they found that by incorporating into a polycarbonate resin, a specific amount of a rubber-modified vinyl resin obtained by graft-polymerizing vinyl monomers onto a specific ethylene-α-olefin rubber polymer, there can be obtained a contacting part of a thermoplastic resin composition superior in moldability, impact strength, mechanical strength and heat resistance, which is characterized in that generation of squeaking noises is remarkably reduced, that an effect of reducing squeaking noises is maintained without deterioration even when being placed under high temperatures for a long time, and further that it can be used in a wide variety of fields including automobile interior parts and the like. Moreover, they found that the effect of reducing the squeaking noises can be enhanced by incorporating into the above-mentioned thermoplastic resin composition, a specific amount of a specific silicone oil and/or a polyolefin wax.

The present invention has been completed based on such findings.

According to the present invention, the following contacting part made of a thermoplastic resin composition is provided:

1. A contacting part made of a thermoplastic resin composition [X] comprising:
   20 to 65 parts by mass of a rubber-reinforced vinyl resin [A]; and
   35 to 80 parts by mass of a polycarbonate resin (provided that the total amount of [A] and [B] is 100 parts by mass);
   wherein:
   the rubber-reinforced vinyl resin [A] comprises a rubber-reinforced vinyl resin [A1] obtained by polymerizing a vinyl monomer [c1] in the presence of an ethylene-α-olefin rubber polymer [a1] having Tm (melting point) of 0° C. or higher; and
   the amount of the ethylene-α-olefin rubber polymer [a1] is 5 to 30% by mass based on 100% by mass of the thermoplastic resin composition [X].

2. The contacting part made of a thermoplastic resin composition as above-mentioned in item 1, wherein the rubber-reinforced vinyl resin [A] contains:
   the rubber-reinforced vinyl resin [A1] obtained by polymerizing the vinyl monomer [c1] in the presence of the ethylene-α-olefin rubber polymer [a1] having Tm (melting point) of 0° C. or higher, and
   a (co)polymer [C] of a vinyl monomer [c3].

3. The contacting part made of a thermoplastic resin composition as above-mentioned in item 1 or 2, wherein the ethylene-α-olefin rubber polymer [a1] comprises 5 to 95% by mass of ethylene and 95 to 5% by mass of an α-olefin (provided that the total amount of the ethylene and the -α-olefin is 100% by mass).

4. The contacting part made of a thermoplastic resin composition as above-mentioned in any one of items 1 to 3, wherein, the rubber-reinforced vinyl resin [A] contains:
   the rubber-reinforced vinyl resin [A1] obtained by polymerizing a vinyl monomer [c1] in the presence of the ethylene-α-olefin rubber poly. [a1];
   a rubber-reinforced vinyl resin [A2] obtained by polymerizing a vinyl monomer [c2] in the presence of a diene rubber polymer [a2]; and
   the total amount of the ethylene-α-olefin rubber polymer [a1] and the diene rubber polymer [a2] is 5 to 30% by mass based on 100% by mass of the thermoplastic resin composition [X].

5. The contacting part made of a thermoplastic resin composition as above-mentioned in item 4, wherein the mass ratio of [a1]:[a2] of the ethylene-α-olefin rubber polymer [a1] and the diene rubber copolymer [a2] is 90 to 15:10 to 85.

6. The contacting part made of a thermoplastic resin composition as above-mentioned in any one of items 1 to 5, wherein 0.1 to 8 parts by mass of a silicone oil [D], and/or, 0.1 to 8 parts by mass of a polyolefin wax [E] based on 100 parts by mass of the thermoplastic resin composition [X] are contained.

7. The contacting part made of a thermoplastic resin composition as above-mentioned in item 6, wherein the silicone oil [D] is at least one silicone oil selected from the group consisting of methylphenyl silicone oil, an alkyl/aralkyl-modified silicone oil and an amino-modified silicone oil.

8. The contacting part made of a thermoplastic resin composition as above-mentioned in any one of items 1 to 7, wherein the contacting part made of a thermoplastic resin composition is used for automobile interior parts, switch parts, business equipment parts, desk rock parts, housing interior parts and open-close damper parts of inside doors.

Advantageous Effects of the Invention

According to the present invention, blending of a specific amount of a rubber-reinforced vinyl resin obtained by graft-polymerizing vinyl monomers onto specific ethylene-α-olefin rubber polymer and a polycarbonate resin makes it possible to obtain such a contacting part made of a thermoplastic resin composition superior in moldability, impact strength, mechanical strength and heat resistance, which is characterized in that squeaking noises produced when parts rub against each other are reduced remarkably, that the effect of reducing squeaking noises does not deteriorate even when being placed at high temperatures for a long time, and further that it can be used in a wide variety of fields such as automobile interior parts and the like.

BRIEF DESCRIPTION OF THE DRAWINGS

FIGS. 2(a), (b), (c) and (d) are model diagrams of a stick slip.

EMBODIMENTS OF THE INVENTION

The present invention will be described in more detail below.

The contacting part made of a thermoplastic resin composition [X] in the present invention comprises:
20 to 65 parts by mass of a rubber-reinforced vinyl resin [A]; and
35 to 80 parts by mass of a polycarbonate resin (provided that the total amount of [A] and [B] is 100 parts by mass); wherein:
the rubber-reinforced vinyl resin [A] comprises a rubber reinforced vinyl resin [A1] obtained by polymerizing a vinyl monomer [c1] in the presence of an ethylene-α-olefin rubber polymer [a1] having Tm of 0° C. or higher; and
the amount of the ethylene-α-olefin rubber polymer [a1] is 5 to 30% by mass based on 100% by mass of the thermoplastic c resin composition [X].

Meanwhile, in the present specification, "(co)polymerization" means homopolymerization and copolymerization, "(meth)acrylic" means acrylic and/or methacrylic, and "(meth)acrylate" means acrylate and/or methacrylate.

1. Rubber-Reinforced Vinyl Resin [A] (Hereinafter Referred to also as "Component [A]"):

Component [A] used in the present invention is a rubber-reinforced vinyl resin [A1] singly, obtained by polymerizing a vinyl monomer [c1] in the presence of an ethylene-α-olefin rubber polymer [a1] having Tm of 0° C. or higher, or, as necessary, a mixture of [A1] and a rubber-reinforced vinyl resin [A2] obtained by polymerizing a vinyl monomer [c2] in the presence of a diene rubber polymer [a2], and/or, a (co)polymer [C] of a vinyl monomer [c3]. The (co)polymer [C] is obtained by polymerizing a vinyl monomer [c3] in the absence of a rubber polymer.

1-1. Ethylene-α-Olefin Rubber Polymer [a1] (Hereinafter Referred to Also as "Component [a1]"):

The ethylene-α-olefin rubber polymer [a1] used in the present invention is not specifically limited if Tm (melting point) is 0° C. or higher.

Examples of the ethylene-α-olefin rubber polymer [a1] include an ethylene-α-olefin copolymer, and an ethylene-α-olefin-nonconjugated diene copolymer. Here, Tm is measured by DSC (differential scanning calorimetry) in which an endothermic change is measured at a constant heating rate of 20° C./minute and a peak temperature of the obtained endothermic pattern is read. The particulars are described in JIS K7121-1987. The Tm is preferably 0 to 120° C., more preferably 10 to 100° C., particularly preferably 20 to 80° C. In cases where the Tm is less than 0° C., the reduction effect of squeaking noises lowers. Meanwhile, when the peak of endothermic change in the DSC measurement is not exhibited clearly, the rubber polymer does not have crystallizability substantially. Accordingly, it is judged as having no Tm and it is not included in the rubber polymer having Tm of 0° C. or higher. Consequently, the rubber polymer having no Tm is also poor in reduction effect of squeaking noises.

The presence of melting point (Tm) in the rubber polymer indicates that it has a crystalline part. The presence of a crystalline part in the rubber polymer, as mentioned above, suppresses occurrence of a stick slip phenomenon, and as a result, generation of squeaking noises is presumably suppressed.

Further, glass transition temperature (Tg) of the rubber polymer is preferably −20° C. or lower, more preferably −30° C. or lower, particularly preferably −40° C. or lower. In cases where the glass transition temperature exceeds −20° C., impact resistance tends to be insufficient. Meanwhile, the glass transition temperature can be obtained in the same manner as in Tm (melting point), using DSC (differential scanning calorimetry) according to JIS K7121-1987.

Examples of the α-olefin constituting the above-mentioned component [a1] include α-olefins having 3 to 20 carbon atoms, and specifically include propylene, 1-butene, 1-pentene, 1-hexene, 4-methyl-1-pentene, 1-heptene, 1-octene, 1-decene, 1-dodecene, 1-hexadecene and 1-eicocene. These α-olefins may be used singly or in combination of two or more. The number of carbon atoms of the α-olefin is preferably 3 to 20, more preferably 3 to 12, and even more preferably 3 to 8. If the number of carbon atoms exceeds 20, the surface appearance of a molded article may become insufficient due to deterioration in copolymerizability. The mass ratio of ethylene α-olefin is usually 5 to 95:95 to 5, preferably 50 to 95:50 to 5, and more preferably 60 to 95:40 to 5.

If the mass ratio of the α-olefin exceeds 95, impact strength of the obtained rubber-reinforced vinyl resin is insufficient, and if it is less than 5, sufficient impact resistance of the resin composition may not be provided because the rubber elasticity of the rubber polymer [a1] becomes insufficient.

Examples of the nonconjugated diene include alkenylnorbornenes, cyclic dienes and aliphatic dienes, and among those, 5-ethylidene-2-norbornene and dicyclopentadiene are preferred. These nonconjugated dienes can be used singly or in combination of two or more. The proportion of the nonconjugated diene to the whole amount of the rubber polymer is usually 0 to 20% by mass, preferably 0 to 10% by mass, and more preferably 0 to 5% by mass. When the proportion of the nonconjugated diene exceeds 20% by mass, the melting point (Tm) of the rubber polymer [a1] lowers or disappears, and the effect of reducing squeaking noises may become insufficient.

The Mooney viscosity ($ML_{1+4}$, at 100° C.; in accordance with JIS K6300) of the component [a1] is usually 5 to 80, preferably 10 to 65, and more preferably 10 to 45. If the Mooney viscosity exceeds 80, the fluidity of an obtained rubber-reinforced vinyl resin may become insufficient, and if the Mooney viscosity becomes less than 5, the impact resistance of an obtained molded article may become insufficient.

The above-mentioned ethylene-α-olefin rubber polymer [a1] is preferred to use those not containing nonconjugated diene components, and among those, an ethylene-propylene copolymer, an ethylene-1-butene copolymer and an ethylene-1-octene copolymer are more preferable, and the ethylene-propylene copolymer is particularly preferable.

The ethylene-α-olefin rubber polymer [a1] also includes a polymer prepared by hydrogenating a block (co)polymer obtained by using a conjugated diene compound such as butadiene and isoprene (it is preferred in terms of weatherability that the hydrogenation ratio of the double bonds of the conjugated diene portions of the polymer is 90% or more). The polymer may be either a cress-linked polymer or a non-cross-linked polymer.

1-2. Diene Rubber Polymer [a2] (Hereinafter Referred to Also as "Component [a2]"):

Examples of the diene rubber polymer [a1] include homopolymers such as polybutadiene and polyisoprene; butadiene-based copolymers such as a styrene-butadiene copolymer, a styrene-butadiene-styrene copolymer, an acrylonitrile-styrene-butadiene copolymer and an acrylonitrile-butadiene copolymer; isoprene-based copolymers such as a styrene-isoprene copolymer, a styrene-isoprene-styrene copolymer and an acrylonitrile-styrene-isoprene copolymer. These may be either random copolymers or block copolymers, and two or more of them may be used in combination. The diene rubber polymer [a2] be either a cross-linked polymer or a non-cross-linked polymer.

1-3. Vinyl Monomers [c1] to [c3]:

The vinyl monomers [c1], [c2] and [c3] each may, without any particular limitations, be any polymerizable compound having an unsaturated bond.

The vinyl monomers [c1], [c2] and [c3] each usually contain an aromatic vinyl compound and a vinyl cyanide compound. If necessary, other copolymerizable vinyl monomers such as (meth)acrylic acid ester and maleimide compounds; functional group-containing vinyl monomers having one or more functional groups such as a carboxyl group, an anhydride group, a hydroxyl group, an amino group, an amide group, an epoxy group and an oxazoline group may be used together. The vinyl monomers [c1] and [c2] to be used for forming the rubber-reinforced vinyl resins [A1] and [A2] may be either the same as or different from each other.

The vinyl monomer [c3] to be used for forming the (co)polymer [C] may be either the same as or different from the vinyl monomer [c1] and/or [c2].

As the above-mentioned aromatic vinyl compound, any compound having at least one vinyl bond and at least one aromatic ring can be used without any particular limitations. Examples thereof include styrene, α-methylstyrene, o-methylstyrene, p-methylstyrene, vinyltoluene, β-methylstyrene, ethylstyrene, p-tert-butylstyrene, vinylxylene, vinylnaphthalene, monochlorostyrene, dichlorostyrene, monobromostyrene, dibromostyrene and fluorostyrene. These may be used singly or in combination of two or more. Among these, styrene and α-methylstyrene are preferred.

Examples of the above-mentioned vinyl cyanide compound include acrylonitrile and methacrylonitrile. These may be used singly or in combination of two or more. Among these, acrylonitrile is preferred.

Examples of the above-mentioned (meth)acrylic acid ester include acrylic acid esters such as methyl acrylate, ethyl acrylate, propyl acrylate, butyl acrylate, amyl acrylate, hexyl acrylate, octyl acrylate, 2-ethylhexyl acrylate, cyclohexyl acrylate, phenyl acrylate and benzyl acrylate; and methacrylic acid esters such as methyl methacrylate, ethyl methacrylate, propyl methacrylate, butyl methacrylate, amyl methacrylate, hexyl methacrylate, octyl methacrylate, 2-ethylhexyl methacrylate, dodecyl methacrylate, octadecyl methacrylate, cyclohexyl methacrylate, phenyl methacrylate and benzyl methacrylate. These may be used singly or in combination of two or more. Among these, methyl methacrylate is preferred.

Examples of the above-mentioned maleimide compound include maleimide, N-methylmaleimide, N-butylmaleimide, N-cyclohexylmaleimide, and N-phenylmaleimide. These may be used singly or in combination of two or more. Among these, N-cyclohexylmaleimide and N-phenylmaleimide are preferred.

Meanwhile, as a method for introducing a monomer unit composed of the maleimide compound into a polymer, there is a method in which maleic anhydride is copolymerized beforehand and then imidation is conducted.

Among the above-mentioned functional group-containing vinyl monomers, examples of unsaturated compounds having a carboxyl group include acrylic acid, methacrylic acid, ethacrylic acid, maleic acid, fumaric acid, itaconic acid, crotonic acid and cinnamic acid. These may be used singly or in combination of two more.

Examples of the unsaturated compound having an acid anhydride group include maleic anhydride, itaconic anhydride and citraconic anhydride. These may be used singly or in combination of two or more.

Examples of the unsaturated compound having a hydroxyl group include hydroxystyrene, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and N-(4-hydroxyphenyl)maleimide. These may be used singly or in combination of two or more.

Examples of the unsaturated compound having an amino group include aminoethyl acrylate, propylaminoethyl acrylate, dimethylaminomethyl acrylate, diethylaminomethyl acrylate, 2-dimethylaminoethyl acrylate, aminoethyl methacrylate, propylaminoethyl methacrylate, dimethylaminomethyl methacrylate, diethylaminoethyl methacrylate, 2-dimethylaminoethyl methacrylate, phenylaminoethyl methacrylate, p-aminostyrene, N-vinyldiethylamine, N-acetylvinylamine, acrylic amine, methacrylic amine and N-methylacrylic amine. These may be used singly or in combination of two or more.

Examples of the unsaturated compound having an amide group include acrylamide, N-methylacrylamide, methacrylamide and N-methylmethacrylamide. These may be used singly or in combination of two or more.

Examples of the unsaturated compound having an epoxy group include glycidyl acrylate, glycidyl methacrylate and allyl glycidyl ether. These may be used singly or in combination of two or more.

Examples of the unsaturated compound having an oxazoline group include vinyl oxazoline. These may be used singly or in combination of two or more.

While the types and the used amounts of the vinyl monomers [c1], [c2] and [c3] are chosen according to the purpose, application, and so on, the total amount of the aromatic vinyl compound and the vinyl cyanide compound is usually 30 to 100% by mass, preferably 50 to 100% by mass, and more preferably 70 to 100% by mass based on 100% by mass of the whole portion of the vinyl monomer. The content of the aforementioned other copolymerizable vinyl monomer is usually 0 to 70% by mass, preferably 0 to 50% by mass, and more preferably 0 to 30% by mass based on 100% by mass of the whole portion of the vinyl monomer. The content of the aforementioned functional group-containing vinyl monomer is usually 0 to 40% by mass, preferably 0 to 30% by mass, and more preferably 0 to 20% by mass based on 100% by mass of the whole portion of the vinyl monomer. The use ratio of the aromatic vinyl compound to the vinyl cyanide compound (aromatic vinyl compound/vinyl cyanide compound) is usually 40 to 85% by mass/15 to 60% by mass, and preferably 45 to 85% by mass/15 to 55% by mass, provided that the total amount of these compounds is taken as 100% by mass.

1-4. Method for Producing of the Rubber-Reinforced Vinyl Resin [A]:

While the aforementioned rubber-reinforced vinyl resin [A] is a polymer component containing an ethylene-α-olefin rubber polymer [a1] and, as necessary, a diene rubber polymer [a2], their contained mode is not particularly restricted.

The rubber-reinforced vinyl resin [A] usually contains a graft copolymer in which a (co)polymer of a vinyl monomer has been grafted to a rubber polymer and a (co)polymer of a vinyl monomer not having grafted to a rubber polymer. It is noted that the graft copolymer may contain a rubber polymer to which no (co)polymer of a vinyl monomer has been grafted.

Therefore, examples of the contained mode of the ethylene-α-olefin rubber polymer [a1] and the diene rubber polymer [a2] are provided below:

(1) A case in which both the ethylene-α-olefin rubber polymer [a1] and the diene rubber polymer [a2] are contained in the form of graft copolymers.

(2) A case in which one of the ethylene-α-olefin rubber polymer [a1] and the diene rubber polymer [a2] is contained in the form of a graft copolymer.

(3) A case in which both the ethylene-α-olefin rubber polymer [a1] and the diene rubber polymer [a2] are contained in the form of ungrafted rubber polymers.

Among these, (1) is preferred.

Examples of the rubber-reinforced vinyl resin [A] of the above-mentioned mode (1) are provided below:

[i] A rubber-reinforced vinyl resin [A1] obtained by polymerizing a vinyl monomer [c1] in the presence of the ethylene-α-olefin rubber polymer [a1], or a mixture composed of the rubber-reinforced vinyl resin [A1] and a rubber-reinforced vinyl resin [A2] obtained by polymerizing a vinyl monomer [c2] in the presence of the diene rubber polymer [a2].

[ii] A mixture composed of the above mentioned mixture [i] and a (co)polymer of a vinyl monomer [c3] (hereinafter referred to also as "(co)polymer [C]").

[iii] A rubber-reinforced vinyl resin [A3] obtained by polymerizing a vinyl monomer [c1] or [c2] in the presence of the ethylene-α-olefin rubber polymer [a1] and the diene rubber polymer [a2].

[iv] A mixture composed of the rubber-reinforced vinyl resin [A3] and the (co)polymer [C].

Among these, [i] and [ii] are preferred in terms of productivity, and [ii] is particularly preferred.

The rubber-reinforced vinyl resin [A] may be a combination of two or more of the above-listed. [i], [ii], [iii] and [iv].

Next, the methods for producing of the rubber-reinforced vinyl resins [A1], [A2] and [A3] will be described.

Examples of the polymerization method include conventional polymerization methods such as emulsion polymerization, solution polymerization, suspension polymerization and bulk polymerization, in any of these methods, it is permissible to feed a vinyl monomer at one time and make it react in the presence of a rubber polymer, and it is also permissible to add a vinyl monomer dividedly or continuously and make it react. Regarding the rubber polymer, the whole amount or a part of it may be added during the polymerization with the vinyl monomer and made to react.

The amount of the rubber polymer used is usually 5 to 80% by mass, and preferably 10 to 70% by mass, provided that the total of the rubber polymer and the vinyl monomer is taken as 100% by mass.

The method for producing of the above-mentioned rubber-reinforced vinyl resin [A1] is preferably solution polymerization and bulk polymerization, and solution polymerization is more preferred. The method for producing the rubber-reinforced vinyl resin [A2] is preferably emulsion polymerization and suspension polymerization. The method for producing the rubber reinforced vinyl resin [A3] is preferably emulsion polymerization, solution polymerization, suspension polymerization and bulk polymerization, and the methods combining these methods may also be used.

When producing the rubber-reinforced vinyl resins [A1], [A2] and [A3] by emulsion polymerization, a polymerization initiator, a chain transfer agent, an emulsifier, water, and so on are usually used. When the rubber polymer is not in a latex form but in a solid form, it can be used after being converted into a latex form by reemulsification.

Examples of the polymerization initiator include redox polymerization initiators composed of organic peroxides such as cumene hydroperoxide, diisopropylbenzene hydroperoxide and paramenthane hydroperoxide, and reducing agents represented by saccharated pyrophosphoric acid formulation and sulfoxilate formulation; persulfates such as potassium persulfate; peroxides such as benzoyl peroxide (BPO), lauroyl peroxide, tertbutyl peroxylaurate and tert-butyl peroxymonocarbonate; and azo polymerization initiators such as 2,2'-azobis(isobutyronitrile). These may be used singly or in combination of two or more. The amount of the polymerization initiator to be used is usually 0.05 to 5% by mass, and preferably 0.1 to 1% by mass based on the total amount of the vinyl monomer [c1] or [c2].

The polymerization initiator is usually added to a reaction system at one time or continuously.

Examples of the chain transfer agent include mercaptans such as octylmercaptan, n-dodecylmercaptan, tert-dodecylmercaptan, n-hexylmercaptan, n-hexadecylmercaptan, n-tetradecylmercaptan and tert-tetradecylmercaptan; terpinolenes, a dimer of α-methylstyrene, tetraethylthiuram sulfide, acrolein, methacrolein, allyl alcohol and 2-ethylhexyl thioglycol. These may be used singly or in combination of two or more. The amount of the chain transfer agent to be used is usually 0.05 to 2% by mass based on the total amount of the vinyl monomer [c1] or [c2].

The emulsifier includes anionic surfactants and nonionic surfactants. Examples of the anionic surfactants include sulfate of higher alcohols; salts of alkylbenzene sulfonic acids such as sodium dodecylbenzenesulfonate; salts of aliphatic sulfonic acids such as sodium laurylsulfate; salts of rosin acids, and salts of phosphoric acid. Examples of the nonionic surfactants include alkyl ester type compounds of polyethylene glycol and alkyl ether type compounds of polyethylene glycol. These may be used singly or in combination of two or more. The amount of the emulsifier to be used is usually 0.3 to 5% by mass based on the whole amount of the vinyl monomer [c1] or [c2].

Emulsion polymerization can be carried out under conventional conditions according to the types and the amounts of the vinyl monomer [c1] or [c2], a polymerization initiator, and so on to be used. The latex obtained by the emulsion polymerization is usually coagulated using a coagulant, the polymer component is formed into a powdery form, which is then purified by washing with water and drying. As the coagulant, inorganic salts such as calcium chloride, magnesium sulfate, magnesium chloride and sodium chloride; inorganic acids such as sulfuric acid and hydrochloric acid; and organic acids such as acetic acid, lactic acid and citric acid, and so on are used. These may be used singly or in combination of two or more. According to the performance required, it is also permissible to do washing after performing neutralization treatment by the addition of an alkali component or an acid component after the coagulation.

When producing the rubber-reinforced vinyl resins [A1], [A2] and [A3] by solution polymerization, a solvent, a polymerization initiator, a chain transfer agent, and so on are usually used.

As the solvent, inert polymerization solvents to be used for conventional radical polymerization can be used; for example, aromatic hydrocarbons such as ethylbenzene and toluene; ketones such as methyl ethyl ketone and acetone; halogenated hydrocarbons such as dichloromethylene and carbon tetrachloride; acetonitrile, dimethylformamide, and N-methylpyrrolidone can be used. These may be used singly or in combination of two or more.

Examples of the polymerization initiator include organic peroxides such as ketone peroxides, dialkyl peroxides, diacyl peroxides, peroxyesters and hydroperoxides. These may be used singly or in combination of two or more.

Examples of the chain transfer agent include mercaptans, terpinolenes and a dimer of α-methylstyrene. These may be used singly or in combination of two or more.

Solution polymerization can be carried out under conventional conditions according to the types and the amounts of the vinyl monomer [c1] or [c2], a polymerization initiator, and so on to be used. The polymerization temperature is usually within the range of 80 to 140° C. The production can also be performed without using any polymerization initiator in the solution polymerization.

Also in the cases of bulk polymerization and suspension polymerization, conventional methods can be applied. As a polymerization initiator, a chain transfer agent, and the like to be used for such methods, there is no particular limitation and the compounds exemplified in the description of the solution polymerization can be used.

1-5. Physical Property of Rubber-Reinforced Vinyl Resin [A]:

The graft ratios of the rubber-reinforced vinyl resins [A1], [A2] and, [A3] obtained in the above-described manners are each usually 10 to 150% by mass, preferably 20 to 120% by mass, and particularly preferably 20 to 80% by mass. If the graft ratio is less than 10% by mass, impact resistance may be insufficient because the interface strength between the graft copolymer and the (co)polymer of the vinyl monomer [c1] or [c2] is low. On the other hand, if the graft ratio exceeds 150% by mass, since a layer of the (co)polymer of the vinyl monomer [c1] or [c2] on the surface of the rubber polymer becomes thick and further a layer of the (co)polymer grafted inside the rubber polymer develops, rubber elasticity decreases and, as a result, impact resistance may deteriorate.

The above-mentioned graft ratio can be calculated by the following formula.

$$\text{Graft ratio (\% by mass)} = \{(S-T)/T\} \times 100$$

In the above formula, S is a mass (g) of an insoluble fraction obtained by charging 1 gram of a rubber-reinforced vinyl resin into 20 ml of acetone (when the rubber polymer is acrylic rubber, acetonitrile is used instead), then shaking the mixture for 2 hours with a shaker under a temperature condition of 25° C., and then centrifuging the mixture for 60 minutes with a centrifugal separator (rotation speed; 23,000 rpm) under a temperature condition of 5° C., thereby separating the insoluble fraction and the soluble fraction, and T is a mass (g) of the rubber polymer contained in 1 g of the rubber-reinforced vinyl resin. The mass of the rubber polymer can be determined by a method of calculating it from a polymerization formulation and a polymerization conversion ratio, a method of determining it from an infrared absorption spectrum (IR), and so on.

The intrinsic viscosity [η] (measured at 30° C. in methyl ethyl ketone) of the acetone soluble fraction of each of the rubber-reinforced vinyl resins [A1], [A2] and [A3] is usually 0.1 to 1.5 dl/g, and preferably 0.2 to 1.0 dl/g. When the intrinsic viscosity [η] is within the above range, a physical property balance between moldability and impact resistance is excellent.

The measurement of the intrinsic viscosity [η] was performed by the following method. First, the acetone-soluble fraction of each of the rubber-reinforced vinyl resins [A1], [A2] and [A3] was dissolved in methyl ethyl ketone, so that five solutions differing in concentration were prepared. A reduced viscosity was measured using a Ubbelohde viscosity tube at each concentration at 30° C., and from the measurements an intrinsic viscosity [η] was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

As described above, the rubber-reinforced vinyl resin [A] according to the present invention may be either one using a rubber-reinforced vinyl resin [A1], or one using a mixture of rubber-reinforced vinyl resins [A1] and [A2], or one using a rubber-reinforced vinyl resin [A3] obtained by polymerizing a vinyl monomer [c1] or [c2] in the presence of an ethylene-α-olefin rubber polymer [a1] and a diene rubber polymer [a2]. Therefore, in the case of using two or more rubber-reinforced vinyl resins like the former, although resins obtained by separate production processes may be used in admixture, it s also possible to obtain by another method, for example, for producing latices respectively containing resins by emulsion polymerization, and then mixing the latices, followed by coagulation.

2. Polycarbonate Resin [B] (Hereinafter Referred to Also as "Component [B]):

The polycarbonate resin [B] used in the present invention is not particularly restricted, but an aromatic polycarbonate is preferable. As the aromatic polycarbonate, it is possible one obtained by ester interchange (transesterification) of an aromatic dihydroxy compound and a diester carbonate, one obtained by interfacial polycondensation using phosgene, and one obtained by a pyridine method using a reaction product of pyridine and phosgene, or the like.

The aromatic dihydroxy compound may be used as far as it has two hydroxyl groups in its molecule, and examples include dihydroxy benzene such as hydroquinone and resorcinol, 4,4'-bisphenol, 2,2-bis(4-hydroxyphenyl)propane (hereinafter referred to also as "bisphenol A"), 2,2-bis(3,5-dibromo-4-hydroxyphenyl)propane, 2,2-bis(4-hydroxyphenyl-3-methylphenyl)propane, 2,2-bis(3-tert-butyl-4-hydroxyphenyl)propane, 2,2-bis(3,5-dimethyl-4-hydroxyphenyl)propane, bis(4-hydroxyphenyl)methane, 1,1-bis(4-hydroxyphenyl)ethane, 2,2-bis(4-hydroxyphenyl)butane, 2,2-bis(p-hydroxyphenyl)pentane, 1,1-bis(4-hydroxyphenyl)cyclopentane, 1,1-bis(p-hydroxyphenyl)-4-isopropylcyclohexane, 1,1-bis(p-hydroxyphenyl)-3,3,5-trimethylcyclohexan, 1,1-bis(p-hydroxyphenyl)-1-phenylethane, 9,9-bis(p-hydroxyphenyl)fluorene, 9,9-bis(p-hydroxy-3-methylphenyl)fluorene, 4,4'-(p-phenylenediisopropylidene)diphenol, 4,4'-(m-phenylenediisopropylidene)diphenol, bis(p-hydroxyphenyl) oxide, bis(p-hydroxyphenyl)ketone, bis(p-hydroxyphenyl) ether, bis(p-hydroxyphenyl)ester, bis(p-hydroxyphenyl) sulfide, bis(p-hydroxy-3-methylphenyl)sulfide, bis(p-hydroxyphenyl)sulfone, bis(3,5-dibromo-4-hydroxyphenyl) sulfone, bis(p-hydroxyphenyl)sulfoxide, and the like. These may be used singly or in combination of two or more.

Among the above-mentioned aromatic dihydroxy compounds, compounds having a hydrocarbon group between two benzene rings. In these compounds, the hydrocarbon group may be those substituted with halogen atoms. Moreover, hydrogen atom contained in the benzene ring may be substituted with halogen atoms. Accordingly, examples of these compounds include bisphenol A, 2,2-bis(3,5-dibromo-4-hydroxyphenyl)propane, 2,2-bis(4-hydroxyphenyl-3-methylphenyl)propane, 2,2-bis(3-tert-butyl-4-hydroxyphenyl)propane, 2,2-bis(3,5-dimethyl-4-hydroxyphenyl) propane, bis(4-hydroxyphenyl)methane, 1,1-bis(p-hydroxyphenyl)ethane, 2,2-bis(p-hydroxyphenyl)butane, and the like.

Among these compounds, especially bisphenol A is preferred.

Examples of the diester carbonate used for obtaining an aromatic polycarbonate by transesterification include dimethyl carbonate, diethyl carbonate, di-tert-butyl carbonate, diphenyl carbonate, ditolyl carbonate, and the like. These may be used singly or in combination of two or more.

The viscosity average molecular weight of the above-mentioned polycarbonate resin [A] is preferably 15,000 to 40,000, more preferably 17,000 to 30,000, and particularly preferably 18,000 to 28,000. As the viscosity average molecular weight becomes higher, the impact resistance tends to be high, but the fluidity tends to be insufficient and the moldability of a composition tends to be poor. Meanwhile, two or more polycarbonate resins differing in viscosity average molecular weight within the above-mentioned range can also be used.

3. (Co)Polymer [C] (Hereinafter Referred to Also as "Component [C]"):

3-1. Method for Producing a (Co)Polymer [C]:

The (co)polymer [C] can be produced by polymerizing a vinyl monomer [c3] in the absence of a rubber polymer by a conventional method such as solution polymerization, bulk polymerization, emulsion polymerization and suspension polymerization. Such polymerization may be either thermal polymerization using no polymerization initiator or catalytic polymerization using a polymerization initiator.

3-2. Physical Properties of a (Co)Polymer [C.]:

The intrinsic viscosity [η] (measured at 30° C. in methyl ethyl ketone) of the polymer [C] is usually 0.1 to 1.5 dl/g, and preferably 0.2 to 1.0 dl/g. When the intrinsic viscosity [η] is within the above range, a physical property balance between moldability and impact resistance is excellent.

The measurement of the intrinsic viscosity [η] was performed by the following method. First, the (co)polymer [C] was dissolved in methyl ethyl ketone, so that five solutions differing in concentration were prepared. A reduced viscosity was measured using a Ubbelohde viscosity tube at each concentration at 30° C., and from the measurements an intrinsic viscosity [η] was determined. The unit is dl/g.

The intrinsic viscosity can be adjusted by appropriately choosing the type and the amount of the chain transfer agent to be used in production, the type and the amount of the polymerization initiator to be used, the polymerization temperature, and so on.

4. Silicone Oil [D] (Hereinafter Referred to Also as "Component [D]"):

The silicone oil as the component [D] used in the present invention is not particularly restricted, and well-known silicone oils can be used as far as they have a polyorganosiloxane structure. The silicone oil [D] may be either an unmodified silicone oil such as dimethyl silicone oil, methylphenyl silicone oil and methyl hydrogen silicone oil, or a modified silicone oil in which various types of organic groups have been introduced to a part of a side chain in a polyorganosiloxane structure and/or one terminal portion of a polyorganosiloxane structure, or both terminal portions of a polyorganosiloxane structure. As the modified silicone oil, alkyl-modified silicone oil, alkyl-aralkyl-modified silicone oil, polyether-modified silicone oil, fluorine-modified silicone oil, higher alkoxy-modified silicone oil, higher fatty acid-modified silicone oil, methylstyryl-modified silicone oil, methyl chlorinated phenyl silicone oil, methyl hydrogen silicone oil, amino-modified silicone oil, epoxy-modified silicone oil, carboxyl-modified silicone oil, acrylic-modified silicone oil, methacrylic-modified silicone oil, mercapto-modified silicone oil, phenol-modified silicone oil, carbinol-modified silicone oil, and the like can be used. These may be used singly or in combination of two or more.

When the silicone oil [D] is methylphenyl silicone oil, alkyl-aralkyl-modified silicone oil and amino-modified silicone oil, generation of squeaking noises is remarkably reduced, and an effect of reducing squeaking noises is maintained without deterioration even when being placed under high temperatures for a long time, and further, contacting parts made of a thermoplastic resin composition superior in impact resistance and molded appearance can be obtained.

Moreover, when the silicone oil [D] used in the present invention is methyl phenyl silicone oil, generation of squeaking noises is more remarkably reduced, and an effect of reducing squeaking noises is more effectively maintained without deterioration even when being placed under high temperatures for a long time.

The methylphenyl silicone oil to be used in the present invention is a non-reactive straight silicone oil in which a part of a side chain of a polysiloxane is a phenyl group.

The alkyl-aralkyl-modified silicone oil to be used in the present invention is a nonreactive modified silicone oil in which an alkyl group and an aralkyl group have been introduced into a part of a side chain of a silicone oil.

The amino-modified silicone oil to be used in the present invention is one in which an amino group has been introduced into a part of a side chain of a polysiloxane, and the amino modification may be either monoamine modification or diamine modification.

The kinematic viscosity at 25° C. of the silicone oil [D] to be used in the present invention is 10 to 100,000 cSt, preferably 10 to 50,000 cSt, more preferably 15 to 50,000 cSt, particularly preferably 20 to 30,000 cSt. If the kinematic viscosity at 25° C. of the silicone oil [D] is less than 10 cSt, the effect of reducing squeaking noises is poor, and if the kinematic viscosity exceeds 100,000 cSt, the dispersibility of the silicone oil [D] in the thermoplastic resin composition [X] becomes poor, so that the impact resistance and the effect of reducing squeaking noises are not provided stably and extrusion processability at the time of melt-kneading also tends to deteriorate.

The kinematic viscosity of a silicone oil was measured with a Ubbelohde viscometer in accordance with ASTM D445-46T (JIS 8803 is also permitted).

5. Polyolefin was [E] (Hereinafter Referred to Also as "Component [E]"):

The polyolefin wax used as the component [E] in the present invention is preferred to use those having relatively low molecular weight, usually in the range of 100 to 10,000 among homopolymers and copolymers of olefins. Concrete examples include polyethylene wax, polypropylene wax, olefin copolymer wax, (for example, ethylene copolymer wax) etc., and further, partial oxides or mixtures thereof are also included. Meanwhile, the structure of the polyolefin wax is either a linear structure or a branched structure. These may be used singly or in combination of two or more.

Examples of the olefin copolymer include, for example, copolymers of two or more of olefins such as ethylene, propylene, 1-butene, 1-hexene, 1-decene, 4-methyl-1-buten, 4-methyl-1-pentene etc., copolymers of these olefins and polymerizable monomers such as unsaturated carboxylic acids and anhydrides thereof ((meth)acrylic acid, maleic anhydride, etc.), (meth)acrylic acid esters ((meth)acrylic acid alkyl esters such as (meth)acrylic acid esters, (meth) acrylic acid ethyl, etc.) or the like. These copolymers include random copolymers, block copolymers or graft copolymers.

The number average molecular weight of the polyolefin wax is preferably 1,000 to 6,000, and more preferably 1,200 to 5,500. In cases where the number average molecular weight is within the above range, releasability is excellent, especially.

The viscosity (140° C.) of the polyolefin wax is preferable 100 to 10,000 cps, and more preferably 100 to 5,000 cps. In cases where the viscosity is within the above range, releasability is excellent especially.

6. Thermoplastic Resin Composition [X]:

The thermoplastic resin composition [X] in the present invention is obtained by mixing the above-mentioned component [A], the above-mentioned component [B] and, if desired, the above-mentioned components [C], [D] and [E] in a prescribed incorporating proportion, and melt-kneading them.

The amounts of the above-mentioned component [A] and the above mentioned component [B] are 20 to 65 parts by mass and 35 to 80 parts by mass, preferably 25 to 65 parts by mass and 35 to 75 parts by mass, more preferably 35 to 65 parts by mass and 85 to 65 parts by mass, and particularly preferably 45 to 65 parts by mass and 35 to 55 parts by mass, respectively, provided that the total amount of the component [A] and the component [B] is taken as 100 parts by mass. If the amount of the component [A] is less than 20 parts by mass and if the amount of the component [B] is more than 80 parts by mass, the effect of reducing squeaking noises and the moldability are poor. On the other hand, if the amount of the component [A] is more than 65 parts by mass and if the amount of the component [B] is less than 35 parts by mass, the form of fracture becomes brittle fracture and the impact resistance also deteriorates.

The content of the ethylene-α-olefin rubber polymer [a1] in the component [A] is 5 to 30% by mass, preferably 5 to 25% by mass, and particularly preferably 5 to 20% by mass, provided that the above-mentioned thermoplastic resin composition [X] is taken as 100% by mass. If the total content is less than 5% by mass, the effect of reducing squealing noises and the impact resistance become poor, and if the total content exceeds 30% by mass, the heat resistance deteriorates.

The mass ratio of the ethylene-α-olefin rubber polymer [a1] to the diene rubber polymer [a2] in the component [A], [a1] [a2], is usually 90 to 15:10 to 85, preferably 80 to 20:20 to 80, more preferably 75 to 25:25 to 75, and particularly preferably 75 to 50:25 to 50. By adjusting the mass ratio of the rubber polymers into this range, the effect of reducing squeaking noises, the impact resistance and the heat resistance become sufficient.

The component [A], if desired, may contain, the (co) polymer [C] of the vinyl monomer [c3]. The amount of the component [C] is preferably 5 to 70% by mass, and more preferably 10 to 60% by mass, provided the total amount of the component [A] is taken as 100% by mass.

The amount of the above-mentioned silicone oil [D] based on 100 parts by mass of the above-mentioned thermoplastic resin composition [X] is usually 0.1 to 8 parts by mass, preferably 0.2 to 6 parts by mass, more preferably 0.5 to 5 parts by mass, and particularly preferably 2.5 to 3.5 parts by mass. If the amount of the component [D] is less than 0.1 part by mass, the effect of reducing squeaking noises tend to be insufficient. On the other hand, if the amount of the component [D] exceeds 8 parts by mass, the appearance and the impact strength of the molded article tend to be insufficient, and further, melt-kneading tends to be difficult.

The amount of the above-mentioned polyolefin wax [E] based on 100 parts by mass of the above-mentioned thermoplastic resin composition [X] is usually 0.1 to 8 parts by mass, preferably 0.2 to 6 parts by mass, more preferably 0.5 to 5 parts by mass, and particularly preferably 2.0 to 5.0 parts by mass. If the amount of the component [E] is less than 0.1 part by mass, the effect of reducing squeaking noises tend to be insufficient. On the other hand, if the amount of the component [E] exceeds 8 parts by mass, the appearance and the impact strength of the molded article tend to be insufficient, and further, melt-kneading tend to be difficult.

The thermoplastic resin composition [X] of the present invention as mentioned above may contain, if necessary, various additives such as a filler, a nucleating agent, a lubricant, a heat stabilizer, an antioxidant, a IN absorber, a flame retardant, an antiaging agent, a plasticizer, an antibacterial agent and a colorant, as far as the object of the present invention is not impaired.

Moreover, the thermoplastic resin composition [X] of the present invention may contain, if necessary, other resins, for example, polyolefin resins such as polyethylene, polypropylene, etc., (however, the component [E] is excluded.), polybutylene terephthalate, polyethylene terephthalate, polyphenylene sulfide, and polyamide, etc., as far as the object of the present invention is not impaired.

The thermoplastic resin composition [X] of the present invention can be produced by mixing respective components in a prescribed incorporation ratio by using a Tumbler mixer or a Henschel mixer, and then melt-kneading them under appropriate conditions by using a mixing machine such as a single screw extruder, a twin screw extruder, a Banbury mixer, a kneader, a roll and a feeder ruder. A preferred kneading machine is a twin screw extruder. In kneading respective components, it is permissible to knead the respective components at one time and it is also permissible to incorporate and knead them dividedly in multiple stages. Moreover, it is also permissible to perform pelletization by using an extruder after kneading with a Banbury mixer, a kneader, or the like. Among fillers, one in a fibrous form prefers a method of feeding it at the middle of an extruder by the use of a side feeder in order to prevent cutting during kneading. The melt-kneading temperature is usually 200 to 300° C., and preferably 220 to 280° C.

7. Contacting Part:

The contacting part of the present invention is obtained by molding the above-described thermoplastic resin composition. There are no limitations the method of producing the contacting part of the present invention from the thermoplastic resin composition, and it can be produced by a conventional method such as injection molding, injection compression molding, gas assisted injection molding, press molding, calender molding, T-die extrusion molding, profile extrusion molding and film molding.

There are no particular limitations with respect to other members with which the contacting part of the present invention comes into contact, and examples thereof are a thermoplastic resin including the thermoplastic resin composition [X] of the present invention, a thermosetting resin, a rubber, an organic material, an inorganic material and a metallic material.

Examples of the thermoplastic resin include polyvinyl chloride, polyethylene, polypropylene, AS resin, ABS resin, AES resin, ASA resin, PMMA, polystyrene, high impact polystyrene, EVA, polyamide (PA), polyethylene terephthalate, polybutylene terephthalate, polycarbonate (PC), polylactic acid, PC/ABS, PC/AES, PA/ABS and PA/AES. These can be used singly or in combination of two or more.

Examples of the thermosetting resin include phenol resin, epoxy resin, urea resin, melamine resin and unsaturated polyester resin. These can be used singly or in combination of two or more.

Examples of the rubber include various synthetic rubbers such as chloroprene rubber, polybutadiene rubber, ethylene-propylene rubber, SEBS, SBS and SIS, and natural rubbers. These can be used singly or in combination of two or more.

Examples of the organic material include an insulation board, an MDF (medium density fiberboard), a hard board, a particle board, a lumber core, an LVL (laminated veneer lumber), an OSB (oriented stack board), a PSL (Para-Lum), a WB (wafer board), a hard fiber board, a soft fiber board, a lumber core plywood, a board core plywood, a special core plywood, a veneer core plywood, a stack sheet/board of paper impregnated with a tap resin, a board produced by mixing an adhesive with fine chips/strips prepared by breaking (used) paper, and then compressing the mixture under heating, and various types of wood. These can be used singly or in combination of two or more.

Examples of the inorganic material include calcium board, flexible board, homocement board, gypsum board, sheathing gypsum board, reinforced gypsum board, gypsum lath board, decorated gypsum board, composite gypsum board, various ceramics and glass. These can be used singly or in combination of two or more.

Moreover, examples of the metallic material include iron, aluminum, copper and various alloys. These can be used singly or in combination of two or more.

The contacting part of the present invention can be suitably used as automobile interior parts, business equipment parts, housing interior parts, and the like, which have parts contacting, jointing or engaging other members.

The automobile interior part can remarkably reduce squeaking noises generated when it comes into contact and rubs against other members. Moreover, it is excellent in safety at the time of collision due to its ductile fracture. Examples of such an automobile interior part include a door trim, a door lining, a pillar garnish, a console, a door pocket, a ventilator, a duct, an air-conditioner, a meter visor, an instrument panel upper garnish, an instrument panel lower garnish, an A/T indicator, on-off switches (a slide part, a slide plate) a grill, front defroster, a grill side defroster, a lid cluster, a cover instrument lower, masks (e.g., a mask switch and a mask radio), a glove box, pockets (e.g., a pocket deck and a pocket card), a steering wheel horn pad, a switch part and exterior parts for car navigation. Among these, it can be used suitably for a ventilator of a car, a plate vane of a ventilator for an air-conditioner of a car, a valve shutter, a louver, a switch part, exterior parts for car navigation, and so on.

The business equipment part of the present invention can remarkably reduce squeaking noises generated when it comes into contact with and rubs against other members. Moreover, it is excellent in safety at the time of collision due to its ductile fracture. Examples of such contacting part for the business equipment part include a desk rock part, a desk drawer, and so on.

The housing interior part of the present invention can remarkably reduce squeaking noises generated when it comes into contact with and rubs against other members. Moreover, it is excellent in safety at the time of collision due to its ductile fracture. Examples of such housing interior part include a shelf door, a chair damper, a folding leg movable part of a table, a door open-close damper, a sliding door rail, a curtain rail, and so on.

EXAMPLES

Hereinafter, the present invention will be described more specifically by way of examples. However, the present invention is not limited to the examples unless departing from the spirit of the invention. In the examples, part and % are on a mass basis, unless otherwise stated.

(1) Evaluation Methods:

The measuring methods of the evaluation items in the following Examples and Comparative Examples are described below.

(1-1) Squeaking Noise Evaluation I (Practical Use Evaluation):

Using an injection molding machine "J-100E" (model name) manufactured by The Japan Steel Works, Ltd., ISO dumbbell specimens made of the thermoplastic resin compositions shown in Table 1 were injection-molded, and the specimens were left at rest in a gear oven at 80° C. for 200 hours. Next, five ISO dumbbell specimens made of the thermoplastic resin compositions shown in Table 1 and as another contacting part, five ISO dumbbell specimens made of PC/ABS "CK43" (trade name) manufactured by Techno Polymer Co., Ltd., which were left at rest similarly in a gear oven at 80° C. for 200 hours were stacked one on another, and both ends thereof were twisted by hand, thereby evaluating a condition of squeaking noise generation. The evaluation was carried out five times and judgment was done on the basis of the following evaluation standard. In addition, the dumbbell specimens left at rest for 400 hours in a gear oven were also evaluated.

Evaluation of an Effect of Reducing Squeaking Noises:

○: In all of the five evaluations, there was only slight generation of squeaking noises.

Δ: In all of the five evaluations, a case where there was remarkable generation of squeaking noises was included.

x: In all of the five evaluations, there was remarkable generation of squeaking noises.

(1-2) Squeaking Noise Evaluation II (Friction Velocity Dependency of Friction Coefficient):

Using an electric injection molding machine "ELJECT NEX30" (model name) manufactured by Nissei Plastic Industrial Co., Ltd., cylindrical specimens having an inner diameter of 20 mm, an outer diameter of 24.8 mm, and a height of 15 mm made of the thermoplastic resin compositions shown in Table 1 and as another contacting part, PC/ABS "CK43" (trade name) manufactured by Techno Polymer Co., Ltd., were injection-molded under the condition specified by a molding temperature of 240° C., a mold temperature of 50° C., and an injection speed of 30 mm/s. Then, the both specimens were left at rest in a gear oven at 80° C. for 400 hours. Next, using a wear friction tester "EFM-III-EN" (trade name) manufactured by ORIENTEC Co., Ltd., a specimen made of CK43 was set, as an object to contact, on the rotation side and a specimen made of the thermoplastic resin composition shown in Table 1 was set on the fixed side. A frictional strength was measured under the conditions specified by a load of 3 kg and rotation speeds (friction speeds) of 50 mm/s, 100 mm/s, and 150 mm/s, and an slope of the coefficient of friction to the friction speed was determined.

(1-3) Heat Deflection Temperature Under Load:

Using an injection molding machine "J-100E" (model name) manufactured by The Japan Steel Works, Ltd., Specimens having a length of 80 mm, a width of 10 mm and a thickness of 4 mm made of the thermoplastic resin compositions shown in Table 1 were injection-molded. The molding conditions were a molding temperature of 250° C. and a mold temperature of 60° C. The evaluation was conducted in accordance with ISO75 and the measurement was conducted by Flat-wise method under a load of 1.82 Mpa.

As the heat deflection temperature under load becomes higher, the heat resistance becomes more excellent.

(1-4) Melt Mass Flow Rate:

Using pellets obtained by extruding the thermoplastic resin compositions shown in Table 1 by a twin screw extruder "TEX44" manufactured by the Japan Steel Works, Ltd., the melt mass flow rate (MFR) was measured in accordance with ISO1133 (temperature: 240° C., load: 98N). The unit is g/10 min.

(1-5) Falling Weight Impact Strength:

Using an electric injection molding machine "ELJECT NEX30" (model name) manufactured by Nissei Plastic Industrial Co., Ltd., plate-shaped specimens having a size of 80 mm×55 mm×2.4 mm made of the thermoplastic resin compositions shown in Table 1 were injection-molded. Each specimen had a side gate of 4 mm×1 mm at the center of one 55 mm side, the resin temperature at the time of molding was 240° C., and the mold temperature was 50° C. Next, using a Shimadzu Hydroshot, high-speed puncture impact testing machine "HITS-P10" (model name) manufactured by Shimadzu Corporation, a breaking energy (J) was measured by punching the above-described specimen under the conditions given below:

Measurement temperature: 23° C.
Punching speed: 6.7 mm/s
Striker tip of a jig for punching test: φ12.7 mm
Dice diameter of a table for receiving a specimen: 43 mm (1-6) Form of Fracture:

The breakage of the periphery of the punched part of the plates after the failing weight impact strength was measured in the above (1-5) was observed, and the breakage length from an end of the punched part being within 5 mm was evaluated as ductile fracture, and the breakage length being more than 5 mm was evaluated as brittle fracture.

When the brittle fracture occurs on the contacting parts at the time of collision, splinters scatter in the surroundings to be unable to procure sufficient safety of crew members, and therefore, the ductile fracture is desired.

(2-1) Component [A]

A1-1: AES-1

A stainless steel autoclave having a volume of 20 liters equipped with a ribbon type stirrer vane, a continuous aid feeder, a thermometer, etc. was charged with 22 parts of an ethylene-α-olefin-based rubber (ethylene-propylene copolymer having an ethylene/propylene=78/22(%) and Mooney viscosity ($ML_{1+4}$, 100° C.) of 20), 55 parts of styrene, 23 parts of acrylonitrile, 0.5 part of tert-dodecyl mercaptan, and 110 parts of toluene, then the internal temperature was raised to 75° C., and then the content in the autoclave was stirred for 1 hour to form a homogeneous solution. Then, 0.45 part of tert-butyl peroxyisopropyl monocarbonate was added and the inner temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. Then, the internal temperature was cooled to 100° C., and 0.2 part of octadecyl-3-(3,5-di-tert-butyl-4-hydroxyphenol) propionate was added. Then, the reaction mixture was taken out from the autoclave, an unreacted substance and a solvent were distilled off therefrom by steam distillation, and moreover volatile components were removed substantially completely by using a 40 mm φ extruder having a vent (cylinder temperature: 220° C., degree of vacuum: 760 mmHg), thereby forming pellets. The resulting ethylene-α-olefin rubber-reinforced vinyl resin had a graft ratio of 70% and the intrinsic viscosity [η] of its acetone-soluble fraction was 0.47 dl/g.

A2: ABS-1

A polymerization vessel equipped with a stirrer was charged with 280 parts of water, 60 parts (in terms of solid) of polybutadiene latex having a weight average particle diameter of 0.26 μm and a gel fraction of 90%, 0.3 part of sodium formaldehyde sulfoxylate, 0.0025 part of ferrous sulfate, and 0.01 part of disodium ethylenediaminetetraacetate, followed by deoxygenation. After heating to 60° C. under stirring under a nitrogen flow, a monomer mixture composed of 10 parts of acrylonitrile, 30 parts of styrene, 0.2 part of tert-dodecyl mercaptan, and 0.3 part of cumene hydroperoxide was dropped at 60° C. continuously over 5 hours. After completion of the dropping, the polymerization temperature was raised to 65° C., and the polymerization was completed after continuing stirring for 1 hour, so that a latex of a graft copolymer was obtained. The polymerization conversion was 98%. Then, the resulting latex was coagulated by adding 0.2 part of 2,2'-methylene-bis(4-ethylene-6-tert-butylphenol) and calcium chloride thereto, and a resin composition in a powder form was obtained after washing, filtration, and drying steps. The graft ratio of the resulting resin composition was 40% and the intrinsic viscosity [η] of the acetone-soluble fraction was 0.38 dl/g.

A3: AES-2

A stainless steel autoclave having a volume of 20 liters equipped with a ribbon type stirrer vane, a continuous aid feeder, a thermometer, etc. was charged with 30 parts of an ethylene-α-olefin-based rubber (ethylene-propylene-dicyclopentadiene copolymer having an ethylene/propylene/dicyclopentadiene=63/32/5(%) and a Mooney viscosity (ML$_{1+4}$, 100° C.) of 33, no melting point (Tm), and glass transition temperature (Tg) of −52° C.), 45 parts of styrene, 25 parts of acrylonitrile, 0.5 part of tert-dodecyl mercaptan, and 140 parts of toluene, then the internal temperature was raised to 75° C., and then the content in the autoclave was stirred for 1 hour to form a homogeneous solution. Then, 0.45 part of tert-butyl peroxyisopropyl monocarbonate was added, and the internal temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. Then, the internal temperature was cooled to 100° C. and 0.2 part of octadecyl-3-(3,5-di-tert-butyl-4-hydroxyphenol)propionate was added. Then, the reaction mixture was taken out from the autoclave, an unreacted substance and a solvent were distilled off therefrom by steam distillation, and moreover volatile components were removed, substantially completely by using a 40 mm φ extruder having a vent (cylinder temperature: 220° C., degree of vacuum: 760 mmHg), thereby forming pellets. The resulting ethylene-α-olefin rubber-reinforced vinyl resin had a graft ratio of 60%, and the intrinsic viscosity [η] of its acetone-soluble fraction was 0.45 dl/g.

A1-2: AES-3

The rubber-reinforced vinyl resin was obtained in the same manner as in AES-1, except that the ethylene-α-olefin rubber polymer [a1] was changed to the polyolefin elastomer "ENGAGE8100" (tread name, ethylene/1-octen=76/24(%), Mooney viscosity (ML$_{1+4}$, 121° C.) of 23, melting point (Tin) of 60° C., glass transition temperature (Tg) of −56° C.) manufactured by Dupont-Dow Elastomer. The resulting rubber-reinforced vinyl resin had a graft ratio of 60%, and the intrinsic viscosity [η] of its acetone-soluble fraction was 0.41 dl/g.

(2-2) Component [B] (Polycarbonate Resin):

B-1: NOVAREX7022PJ (manufactured by Mitsubishi Engineering-Plastics Corporation), whose viscosity average molecular weight (Mv) was 22,000.

B-2: NOVAREX7022PJ-LH1 (manufactured by Mitsubishi Engineering-Plastics Corporation), whose viscosity average molecular weight was 18,500.

(2-3) Component [C] AS:

A polymerization vessel equipped with a stirrer was charged with 250 parts of water and 1.0 part of sodium palmitate. Following deoxygenation, the mixture was heated to 70° C. under stirring under a nitrogen flow. Furthermore, 0.4 part of sodium formaldehyde sulfoxylate, 0.0025 part of ferrous sulfate, and 0.01 part of disodium ethylenediaminetetraacetate were charged, and then a monomer mixture composed of 70 parts of α-methylstyrene, 25 parts of acrylonitrile, 5 parts of styrene, 0.5 part of tert-dodecyl mercaptan, and 0.2 part of cumene hydroperoxide was dropped continuously over 7 hours at a polymerization temperature of 70° C. After completion of the dropping, the polymerization temperature was raised to 75° C., and the polymerization was completed by continuing stirring for 1 hour, so that a latex of a copolymer was obtained. The polymerization conversion was 99%. Then, the resulting latex was coagulated by adding calcium chloride, and a copolymer in a powder form was obtained after washing, filtration, and drying steps. The intrinsic viscosity [η] of the acetone-soluble fraction of the resulting copolymer was 0.40 dl/g.

(2-4) Component [D] (Silicone Oil):

D-1: Methylphenyl silicone oil; KF54 (trade name: produced by Shin-Etsu Silicones), whose kinematic viscosity at 25° C. was 400 cSt.

D-2: Amino-modified silicone oil; TSF4700 (trade name: produced by Momentive Performance Materials Japan LLC), whose kinematic viscosity at 25° C. was 50 cSt.

D-3: Alkyl-aralkyl-modified silicone oil; XF42-334 (trade name: produced by Momentive Performance Materials Japan LLC), whose kinematic viscosity at 25° C. was 1300 cSt.

(2-5) Component [E] (Polyolefin Wax):

E-1: SANWAX171-P (manufactured by Sanyo Chemical Industries, Ltd.,), whose number average molecular weight (Mn) was 1,500.

E-2: SANWAX161-P (manufactured by Sanyo Chemical Industries, Ltd.,), whose number average molecular weight (Mn) was 5,000.

(2-6) Component [F] (Additives):

F-1: Ethylene-bisstearic acid amide; KAOWAX EB-P (trade name: produced by Kao Corp.)

F-2: 1,3,5-Tris(3,5-di-tert-butyl-4-hydroxybenzyl)-s-triazine-2,4,6-(1H,3H,5H)trione; ADK STAB AO-20 (trade name: produced by ADEKA Corp.)

F-3: Bis(2,4-di-tert-butylphenyl)pentaerythritol diphosphite; ADK STAB PEP-24G (trade name: produced by ADEKA Corp.)

Examples 1-19 and Comparative Examples 1-6

The thermoplastic resin compositions comprising the above-described components [A] to [F] were mixed in the incorporation ratios shown in Table 1 by using a Henschel mixer, and then were kneaded in a twin screw extruder (manufactured by The Japan Steel Works, Ltd., TEX44, barrel preset temperature 250° C.), so that a thermoplastic resin composition was pelletized. Using the resulting pellets, specimens for evaluation as described above were molded. Using the specimens obtained, evaluations were carried out by the methods described above. The results of the evaluations are shown in Table.

TABLE 1

| Thermoplastic resin compositions and physical properties | | Examples | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Rubber-reinforced vinyl resins [A] (Parts) | A1-1: Rubber polymer [a1] (Tm 40° C.) AES-1 | 40 | 40 | 40 | 30 | | | | | | | | | | | | | | | |
| | A2: Rubber polymer [a2] ABS-1 | | | | | 15 | 15 | 15 | 5 | | | | | | | | | | | |
| | A3: Rubber polymer [a2] ABS-2 | | | | | | | | | 42 | 20 | 25 | 25 | 25 | 25 | 25 | 25 | 25 | 25 | |
| | A1-2: Rubber polymer [a1] (Tm 60° C.) AES-3 | | | | | | | | | 8 | 20 | 15 | 15 | 15 | 15 | 15 | 15 | 15 | 15 | 40 |
| Polycarbonate resins [B] (Parts) | B-1 Mv 22000 | 40 | 50 | 60 | 70 | 40 | 50 | 60 | 70 | 50 | 50 | | 50 | 50 | 50 | 50 | 50 | 50 | 50 | 60 |
| | B-2 Mv 18500 | | | | | | | | | | | 50 | | | | | | | | |
| (Co)polymer [C]: AS resin [c1] (Parts) | | 20 | 10 | | | 20 | 10 | | | | 10 | 10 | 10 | 10 | 10 | 10 | 10 | 10 | 10 | |
| Silicone oils [D] (Parts) | D-1 Methyl phenyl 400 cSt | 3 | 3 | 3 | 3 | 3 | 3 | 3 | 3 | 3 | 3 | 3 | 5 | 1 | | | 3 | | 0 | 3 |
| | D-2 Amino 50 cSt | | | | | | | | | | | | | | 3 | | | | | |
| | D-3 Alkyl-aralkyl 1300 cSt | | | | | | | | | | | | | | | 3 | | | | |
| Polyolefin waxes [E] (Parts) | E-1 Mn 1500 | | | | | | | | | | | | | | | | | 3 | | |
| | E-2 Mn 5000 | | | | | | | | | | | | | | | | 3 | | | |
| Additives [F] (Parts) | F-1 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | F-2 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | F-3 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 3.2 | 0.2 | 0.2 |
| Rubber polymers | Amount of rubber (%) | 9 | 9 | 9 | 7 | 15 | 15 | 15 | 9 | 14 | 16 | 15 | 15 | 15 | 15 | 15 | 15 | 15 | 15 | 9 |
| | [a1]/([a1] + [a2]) | 100 | 100 | 100 | 38 | 38 | 38 | 65 | 65 | 27 | 35 | 38 | 38 | 38 | 38 | 38 | 38 | 38 | 38 | 100 |
| | [a2]/([a1] + [a2]) | 0 | 0 | 0 | 62 | 62 | 35 | 34 | 73 | 62 | 62 | 62 | 62 | 62 | 62 | 62 | 62 | 62 | 62 | 62 |
| Evaluation of squeaking noises | I Practical use evaluation (200 hours) | ○ | ○ | ○ | ○ | ○ | ○ | ○ | ○ | ○ | ○ | ○ | ○ | ○ | ○ | ○ | ○ | ○ | ○ | ○ |
| | Practical use evaluation (400 hours) | ○ | ○ | ○ | ○ | ○ | ○ | ○ | ○ | ○ | ○ | Δ | ○ | ○ | ○ | ○ | ○ | ○ | Δ | ○ |
| | II Friction velocity dependency of friction coefficient (400 hours) | 0 | 0 | 0 | 0 | 0 | 0 | 0 | 0 | 0 | −0.3 | 0 | 0 | −0.7 | −0.3 | −0.3 | −0.4 | −0.5 | −0.7 | 0.0 |
| Heat deflection temperature under load (1.82 MPa) (° C.) | | 95 | 96 | 99 | 104 | 95 | 96 | 99 | 102 | 97 | 95 | 96 | 95 | 96 | 96 | 96 | 93 | 83 | 96 | 99 |
| Melt mass flow rate (240° C. × 98N) (g/10 min) | | 48 | 44 | 29 | 24 | 53 | 47 | 32 | 20 | 49 | 41 | 49 | 48 | 46 | 47 | 47 | 45 | 46 | 45 | 31 |
| Falling weight impact strength (J) | | 25 | 28 | 31 | 31 | 27 | 30 | 33 | 32 | 28 | 31 | 29 | 29 | 31 | 30 | 30 | 29 | 29 | 31 | 33 |
| Form of fracture | | ductile | ductile | ductile | ductile | ductile | ductile | ductile | ductile | ductile | ductile | ductile | ductile | ductile | ductile | ductile | ductile | ductile | ductile | ductile |

| Thermoplastic resin compositions and physical properties | | | Comp. Examples | | | | | |
|---|---|---|---|---|---|---|---|---|
| | | | 1 | 2 | 3 | 4 | 5 | 6 |
| Rubber-reinforced vinyl resins [A] (Parts) | A1-1:AES-1 | Rubber polymer [a1] (Tm 40° C.) | 0 | 25 | 0 | 25 | 70 | |
| | A2:ABS-1 | Rubber polymer [a2] | 30 | 15 | | 15 | | |
| | A3:AES-2 | Rubber polymer [a3] | | | | | | 50 |
| | A1-2:AES-3 | Rubber polymer [a1] (Tm 60° C.) | | | | | | |
| Polycarbonate resins [B] Parts) | B-1 | Mv 22000 | 50 | 30 | 100 | 0 | 30 | 50 |
| | B-2 | Mv 18500 | | | | | | |
| (Co)polymer [C] (Parts) | C:AS | AS resin [c1] | 20 | 30 | | 60 | | |
| Silicone oils [D] (Parts) | D-1 | Methyl phenyl 400 cSt | 3 | 3 | 3 | 3 | 3 | 3 |
| | D-2 | Amino 50 cSt | | | | | | |
| | D-3 | Alkyl-aralkyl 1300 cSt | | | | | | |
| Polyolefin waxes [E] (Parts) | E-1 | Mn 1500 | | | | | | |
| | E-2 | Mn 5000 | | | | | | |
| Additives [F] (Parts) | F-1 | | 0.5 | 0.5 | 0.5 | 0.5 | 0.5 | 0.5 |
| | F-2 | | 0.1 | 0.1 | 0.1 | 0.1 | 0.1 | 0.1 |
| | F-3 | | 0.2 | 0.2 | 0.2 | 0.2 | 0.2 | 0.2 |
| Rubber polymers | | Amount of rubber (%) | 18 | 15 | 0 | 15 | 15 | 15 |
| | | [a1]/([a1] + [a2]) | 0 | 38 | — | 38 | 100 | — |
| | | [a2]/([a1] + [a2]) | 100 | 62 | — | 62 | 0 | — |
| Evaluation of squeaking noises | 1 | Practical use evaluation (200 hours) | x | ○ | x | ○ | ○ | ○ |
| | | Practical use evaluation (400 hours) | x | ○ | x | ○ | ○ | x |
| | II | Friction velocity dependency of friction coefficient (400 hours) | −3.2 | 0 | −4.6 | 0 | 0 | −2.9 |
| Heat deflection temperature under load (1.82 MPa) (° C.) | | | 96 | 94 | 123 | 76 | 76 | 93 |
| Melt mass flow rate (240° C. × 98N) (g/10 min) | | | 38 | 45 | 11 | 43 | 41 | 45 |
| Falling weight impact strength (J) | | | 42 | 23 | 38 | 20 | 17 | 35 |
| Form of fracture | | | ductile | brittle | ductile | brittle | brittle | ductile |

As is obvious from Table 1, the thermoplastic resin compositions of the present invention represented by Examples 1 to 19 can provide molded articles with which squeaking noises are reduced and which have heat resistance, impact resistance, resin fluidity and form of fracture in good balance.

Conversely, Comparative Example 1, which is an example p f containing no ethylene-α-olefin rubber polymer [a1], is inferior in the effect of reducing squeaking noises. Comparative Example 2, which is an example in which the amount of the polycarbonate resin [B] was excessively small, is inferior in safety because of brittle fracture. In Comparative Example 3, which is an example in which the amount of the polycarbonate resin [B] was excessively large, not only the effect of reducing squeaking noises remarkably lowers, but also the moldability deteriorates because of shortage of the fluidity of the melted resin. Comparative Example 4, which is an example containing no polycarbonate resin [B], is low in heat resistance and is poor in safety because of brittle fracture. In Comparative Example 5, which is an example in which the amount of the rubber-reinforced vinyl resin [A] is excessively large and the amount of the polycarbonate resin [B] is excessively small, is low in heat resistance and impact resistance and poor in safety because of brittle fracture. Comparative Example 6 is an example in which an AES using a base rubber other than the ethylene-α-olefin rubber polymer [a1], is poor in the effect of reducing squeaking noises (practiced use evaluation: 400 hours).

Example 20

Figure 3:
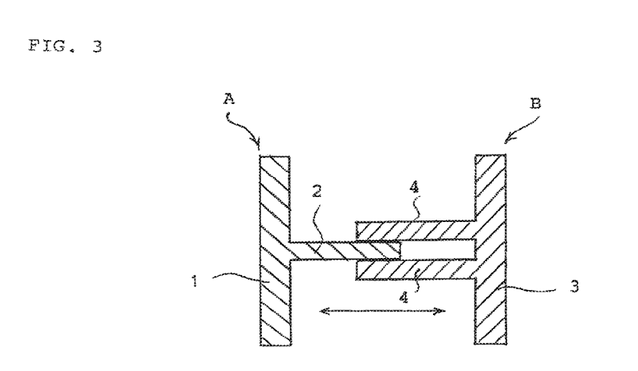
FIG. 3 is a schematic illustration showing a method for investigating generation of squeaking noises.

As illustrated in FIG. 3, as a contacting part A, a T-shaped part comprising a base portion 1 and a rising portion 2, made of the thermoplastic resin composition of Example 2 and as another contacting part B, a catching part comprising a base portion 3 and two rising portion 4,4 closely sandwiching the rising portion 2 are prepared. The both contacting parts A and B were left at rest in a gear over at 80° C. for 200 hours, and assembled so that the rising portion 2 of the T-shaped part was sandwiched in between the two rising portions 4,4, then moved slidably as indicated by an arrow to thereby investigate the generation or no of the squeaking noises. As a result, the generation of the squeaking noises was not recognized.

Comparative Examples 7 and 8

The generation or no of the squeaking noises was investigated in the same manner as in example 20, except that as the contacting part A, the thermoplastic resin composition of the T-shaped part was changed to these of comparative Examples 1 and 3, respectively, and the generation or no of the squeaking noises was investigated in the same manner as in Example 20. As a result, in both cases the generation of the squeaking noises was recognized.

As apparent from the above, it is understood that the contacting part made of the thermoplastic resin composition is suitable for automobile interior parts, business equipment parts, housing interior parts and the like, which have portions contacting, jointing or engaging with other members.

INDUSTRIAL APPLICABILITY

The contacting part of the present invention can provide one made of a thermoplastic resin composition, which is characterized in that generation of squeaking noises that are generated when members rub against each other is remarkably reduced, that an effect of reducing squeaking noises is maintained without deterioration even when being placed under high temperatures for a long time, and further that impact resistance is superior. It can be used suitably for automobile interior parts, business equipment parts, housing interior parts, and so on, which have portions contacting, jointing or engaging with other members.

DESCRIPTION OF REFERENCE SIGNS

M Object
V Driving speed
μs Coefficient of friction of the upper end of saw wavy form (coefficient of static friction)
μl Coefficient of friction of the lower end of saw wavy form
Δμ μs-μl
A Contacting part
B Other contacting part
1 Base portion
2 Rising portion
3 Base portion
4 Rising portion

The invention claimed is:

1. An engaging system, comprising:
   a first member that is an engaging part made of a thermoplastic resin composition [X] consisting of:
   20 to 65 parts by mass of a rubber-reinforced vinyl resin [A]; and
   35 to 80 parts by mass of a polycarbonate resin [B];
   wherein the total amount of [A] and [B] is 100 parts by mass,
   wherein the rubber-reinforced vinyl resin [A] comprises a rubber-reinforced vinyl resin [A1] obtained by polymerizing a vinyl monomer [c1] in the presence of an ethylene-α-olefin rubber polymer [a1] having melting point Tm of 0° C. or higher;
   wherein the ratio of the mass of ethylene to the mass of α-olefin in the ethylene-α-olefin rubber polymer is 60:40 to 95:5;
   wherein the amount of the ethylene-α-olefin rubber polymer [a1] is 5 to 30% by mass based on 100% by mass of the thermoplastic resin composition [X], and
   a second member that is another engaging part made of the thermoplastic resin composition [X] or other thermoplastic resin selected from the group consisting of polypropylene, ABS resin, PMMA, polycarbonate (PC) and PC/ABS, and
   wherein when the composition [X] of the first member and the second member come into contact with and rub against each other, squeaking noises are reduced.

2. The engaging system made of a thermoplastic resin composition according to claim 1, wherein the rubber-reinforced vinyl resin [A] further contains:
   a (co)polymer [C] of a vinyl monomer [c3].

3. The engaging system made of a thermoplastic resin composition according to claim 1, wherein the contacting part made of a thermoplastic resin composition [X] is used for automobile interior parts, switch parts, business equipment parts, housing interior parts and/or open-close damper parts of inside doors.

4. An engaging system, comprising:
   a first member that is an engaging part made of a thermoplastic resin composition [X] consisting of:
   20 to 65 parts by mass of a rubber-reinforced vinyl resin [A];
   35 to 80 parts by mass of a polycarbonate resin [B];
   wherein the total amount of [A] and [B] is 100 parts by mass; and
   0.1 to 8 parts by mass of a silicone oil [D], and/or, 0.1 to 8 parts by mass of a polyolefin wax [E];
   wherein the rubber-reinforced vinyl resin [A] comprises a rubber-reinforced vinyl resin [A1] obtained by polymerizing a vinyl monomer [c1] in the presence of an ethylene-α-olefin rubber polymer [a1] having melting point Tm of 0° C. or higher;
   wherein the ratio of the mass of ethylene to the mass of α-olefin in the ethylene-α-olefin rubber polymer is 60:40 to 95:5;
   wherein the amount of the ethylene-α-olefin rubber polymer [a1] is 5 to 30% by mass based on 100% by mass of the thermoplastic resin composition [X], and
   a second member that is another engaging part made of the thermoplastic resin composition [X] or other thermoplastic resin selected from the group consisting of polypropylene, ABS resin, PMMA, polycarbonate (PC) and PC/ABS, and
   wherein when the composition [X] of the first member and the second member come into contact with and rub against each other, squeaking noises are reduced.

5. The engaging system made of a thermoplastic resin composition according to claim 4, wherein the silicone oil [D] is at least one silicone oil selected from the group consisting of methylphenyl silicone oil, an alkyl- and/or aralkyl modified silicone oil, and an amino-modified silicone oil.

* * * * *